(12) United States Patent
Morishita

(10) Patent No.: US 7,247,996 B2
(45) Date of Patent: Jul. 24, 2007

(54) PROJECTOR

(75) Inventor: Isaya Morishita, Daito (JP)

(73) Assignee: Funai Electric Co., Ltd., Daito-shi, Osaka ( * ) Notice: Subject to any disclaimer, the term of this patent is extended or adjusted under 35 U.S.C. 154(b) by 0 days.

(21) Appl. No.: 11/444,138

(22) Filed: May 31, 2006

(65) Prior Publication Data

US 2006/0267513 A1    Nov. 30, 2006

(30) Foreign Application Priority Data

May 31, 2005    (JP) .............................. 2005-159498

(51) Int. Cl.
*H05B 41/16* (2006.01)

(52) U.S. Cl. ...................... 315/247; 315/225; 315/291; 315/224; 315/307; 353/85; 323/282; 323/285

(58) Field of Classification Search ................ 315/247, 315/225, 224, 291, 307, 276, DIG. 7; 353/52, 353/85; 323/234, 246, 285, 282, 283; 363/18, 363/25, 23, 47, 21.12, 21.13

See application file for complete search history.

(56) References Cited

U.S. PATENT DOCUMENTS

| | | | | |
|---|---|---|---|---|
| 5,917,711 | A | * | 6/1999 | Shikata et al. ................. 363/16 |
| 6,154,473 | A | * | 11/2000 | Watanabe ................. 372/38.02 |
| 6,177,739 | B1 | * | 1/2001 | Matsudaira et al. ........ 307/125 |
| 6,750,620 | B2 | * | 6/2004 | Suzuki ........................ 315/291 |
| 7,040,762 | B2 | | 5/2006 | Yasuda |

FOREIGN PATENT DOCUMENTS

| | | |
|---|---|---|
| JP | 11-308858 | 11/1999 |
| JP | 2004-361466 | 12/2004 |

OTHER PUBLICATIONS

Patent Abstracts of Japan, Publication No. 2004-361466, Publication Date: Dec. 24, 2004, 2 pages.
Patent Abstracts of Japan, Publication No. 11-308858, Publication Date: Nov. 5, 1999, 1 page.

* cited by examiner

*Primary Examiner*—Haissa Philogene
(74) *Attorney, Agent, or Firm*—Osha Liang LLP

(57) ABSTRACT

The present invention is directed to decrease temperature rise in a power supply circuit in a standby mode by using existing signals and circuits while suppressing cost. In a power supply circuit having a power-factor improving circuit for improving a power factor seen from an AC power supply side, and a switching regulator constructed by a self-oscillating converter to which the power-factor improving circuit is connected on a primary side of a transformer and from which DC voltages for a load are output on a secondary side, a lamp turn-on permission signal to be supplied to a lamp driving circuit is detected by a signal detecting circuit. In a standby mode in which the lamp turn-on permission signal is not detected, operation of a PFC (Power Factor Correction) control unit provided in the power-factor improving circuit is stopped.

3 Claims, 5 Drawing Sheets

PROJECTOR

BACKGROUND OF THE INVENTION

1. Field of the Invention

The present invention relates to a projector for projecting a video image onto a screen and, more particularly, to a technique for suppressing unnecessary heat generation by a power supply circuit in a standby mode.

2. Description of the Related Art

In a casing of a projector, heat sources such as a lamp and a power supply circuit are provided. When the temperature in the casing becomes high due to heat generated from these heat sources, various adverse effects such as thermal deformation of the casing and deterioration in the performances of electric circuits occur. In order to dissipate the heat generated from the heat sources to outside, a cooling fan is provided. Generally, a projector has the function of the standby mode of turning off a lamp. By setting the standby mode except when the projector is used, the life of the lamp is extended and electricity can be saved. Japanese Patent Laid-Open (JP-A) No. 2004-361466 discloses a projector realizing reduction in noise by stopping the rotation of a cooling fan in the standby mode.

On the other hand, as a power supply circuit of a projector, a circuit obtained by adding a power-factor improving circuit to a switching regulator is generally used. The switching regulator is a stabilized DC power supply for performing DC-DC conversion by turning on/off a switching element connected to a transformer at high speed. The power-factor improving circuit is provided to improve power consumption efficiency by improving the power factor seen from the power supply side by making a current waveform close to a voltage waveform. JP-A No. Hei 11-308858 discloses a power supply circuit having a switching regulator and a power-factor improving circuit (in this document, however, a projector is not described).

In a conventional projector, the power-factor improving circuit operates not only in a normal operation mode in which the lamp is ON but also in the standby mode in which the lamp is OFF. An inherent purpose of the power-factor improving circuit is, however, to prevent occurrence of noise failure. The noise failure occurs when a current waveform becomes a pulse shape even if a voltage waveform is a sine wave in a state where the lamp is ON, the power factor decreases and, due to the decrease, higher harmonics enter a power supply line. In the standby mode in which the lamp is OFF, current of higher harmonics is not an issue. Therefore, it is useless to make the power-factor improving circuit operate in the standby mode. In addition, heat is generated by the power supply circuit, so that forced cooling with a fan becomes necessary. As a result, power consumption increases and a problem of noise of the fan occurs.

In the above-mentioned JP-A No. Hei 11-308858, in a pre-heat (standby) state in which power supply to a load is stopped, the operation of the power-factor improving circuit is stopped by a control signal output from an ON/OFF control unit. With the configuration, the power-factor improving circuit does not operate in the standby mode, and unnecessary heat generation can be suppressed. However, as mentioned above, JP-A No. Hei 11-308858 does not include description of a projector. According to JP-A No. Hei 11-308858, concrete technical means used for stopping the operation of the power-factor improving circuit in the projector is not clear. For example, it may be assumed that when the standby mode is set by an operation unit of the projector, a signal indicative of the standby mode is generated by a microcomputer and sent to a power supply circuit, thereby stopping the operation of the power-factor improving circuit. However, in this case, software for generating and transmitting a special signal and a signal line extending from a control board to a power supply board are additionally required, which causes a problem of an increase in the cost accordingly. Neither does JP-A No. 2004-361466 describe a solution to such a point.

SUMMARY OF THE INVENTION

An object of the present invention is to reduce temperature rise in a power supply circuit in a standby mode while suppressing the cost by utilizing existing signals and circuits in a projector.

A projector according to a first invention includes: a lamp for projection; a lamp driving circuit for driving the lamp; and a power supply circuit for supplying a predetermined DC voltage to the lamp driving circuit. By supplying a lamp turn-on permission signal to the lamp driving circuit, the lamp is turned on. The power supply circuit has a rectifier circuit for performing full-wave rectification on an AC voltage of a power source, a power-factor improving circuit for improving a power factor seen from the power source side, to which the voltage subjected to the full-wave rectification in the rectifier circuit is supplied, and a switching regulator to which the power-factor improving circuit is connected on a primary side of a transformer and from which a DC voltage for a load is output on a secondary side. The first invention is characterized in that a signal detecting circuit for detecting the lamp turn-on permission signal is provided, and in a standby state in which the lamp turn-on permission signal is not detected by the signal detecting circuit, operation of a PFC (Power Factor Correction) control unit provided in the power-factor improving circuit is stopped based on an output of the signal detecting circuit.

In the first invention, attention is paid to the point that the lamp turn-on permission signal does not exist in the standby mode. By detecting the presence or absence of the lamp turn-on permission signal, the operation of the PFC control unit is stopped. Thus, by using the existing lamp turn-on permission signal, the power-factor improving circuit can be made inoperative in the standby mode.

A projector according to a second invention includes: a lamp for projection; a lamp driving circuit for driving the lamp; and a power supply circuit for supplying a predetermined DC voltage to the lamp driving circuit. By supplying a lamp turn-on permission signal to the lamp driving circuit, the lamp is turned on. The power supply circuit includes a rectifier circuit for performing full-wave rectification on an AC voltage of a power source, a power-factor improving circuit for improving a power factor seen from the power source side, to which the voltage subjected to the full-wave rectification in the rectifier circuit is supplied, and a switching regulator to which the power-factor improving circuit is connected on a primary side of a transformer and from which a DC voltage for a load is output on a secondary side. The second invention is characterized in that a current detecting circuit for detecting current in the lamp driving circuit is provided and, in a standby state in which current detected by the current detecting circuit is equal to or less than a predetermined value, operation of a PFC control unit provided in the power-factor improving circuit is stopped based on an output of the current detecting circuit.

In the second invention, attention is paid to the point that the current in the lamp driving circuit becomes a predetermined value or less in the standby mode. By detecting the current, the operation of the PFC control unit is stopped. Thus, by using the current in the existing lamp driving circuit, the power-factor improving circuit can be made inoperative in the standby mode.

A projector according to a third invention includes: a lamp for projection; a lamp driving circuit for driving the lamp; and a power supply circuit for supplying a predetermined DC voltage to the lamp driving circuit. The power supply circuit includes a rectifier circuit for performing full-wave rectification on an AC voltage of a power source, a power-factor improving circuit for improving a power factor seen from the power source side, to which the voltage subjected to the full-wave rectification in the rectifier circuit is supplied, and a switching regulator to which the power-factor improving circuit is connected on a primary side of a transformer and from which a DC voltage for a load is output on a secondary side. The switching regulator is constructed by a self-oscillating converter having a switching element connected to a winding on the primary side of the transformer and performing switching operation, and a feedback circuit for feeding back a voltage on the secondary side of the transformer and controlling switching operation by the switching element. The third invention is characterized in that, based on a fact that an output voltage of a winding for supplying a drive voltage, which is provided on the primary side of the transformer and on which feedback control is not performed, drops in a standby state in which the lamp is turned off, by setting a drive voltage of a PFC control unit provided in the power-factor improving circuit to a predetermined value or less, operation of the PFC control unit is stopped.

In the third invention, in the case of a self-oscillating converter, attention is paid to the point that an output voltage of a winding on which feedback control is not performed drops in a light load state such as a standby mode. By setting the drive voltage of the PFC control unit to a predetermined value or less by using the drop in the output voltage, the operation of the PFC control unit is stopped. Thus, without adding a new circuit, only by adjusting the number of turns of a winding of a transformer or the like, the power-factor improving circuit can be made inoperative in the standby mode.

According to the present invention, by using an existing signal or circuit included in the projector, the operation of the power-factor improving circuit is stopped. Thereby, extra software or line is unnecessary. While suppressing the cost, temperature rise in the power supply circuit in the standby mode can be decreased. Moreover, forced cooling with a fan becomes unnecessary, so that useless power consumption and occurrence of noise can be prevented.

DETAILED DESCRIPTION OF THE PREFERRED EMBODIMENTS

Embodiments of the present invention will be described hereinafter with reference to the appended drawings.

Figure 1:
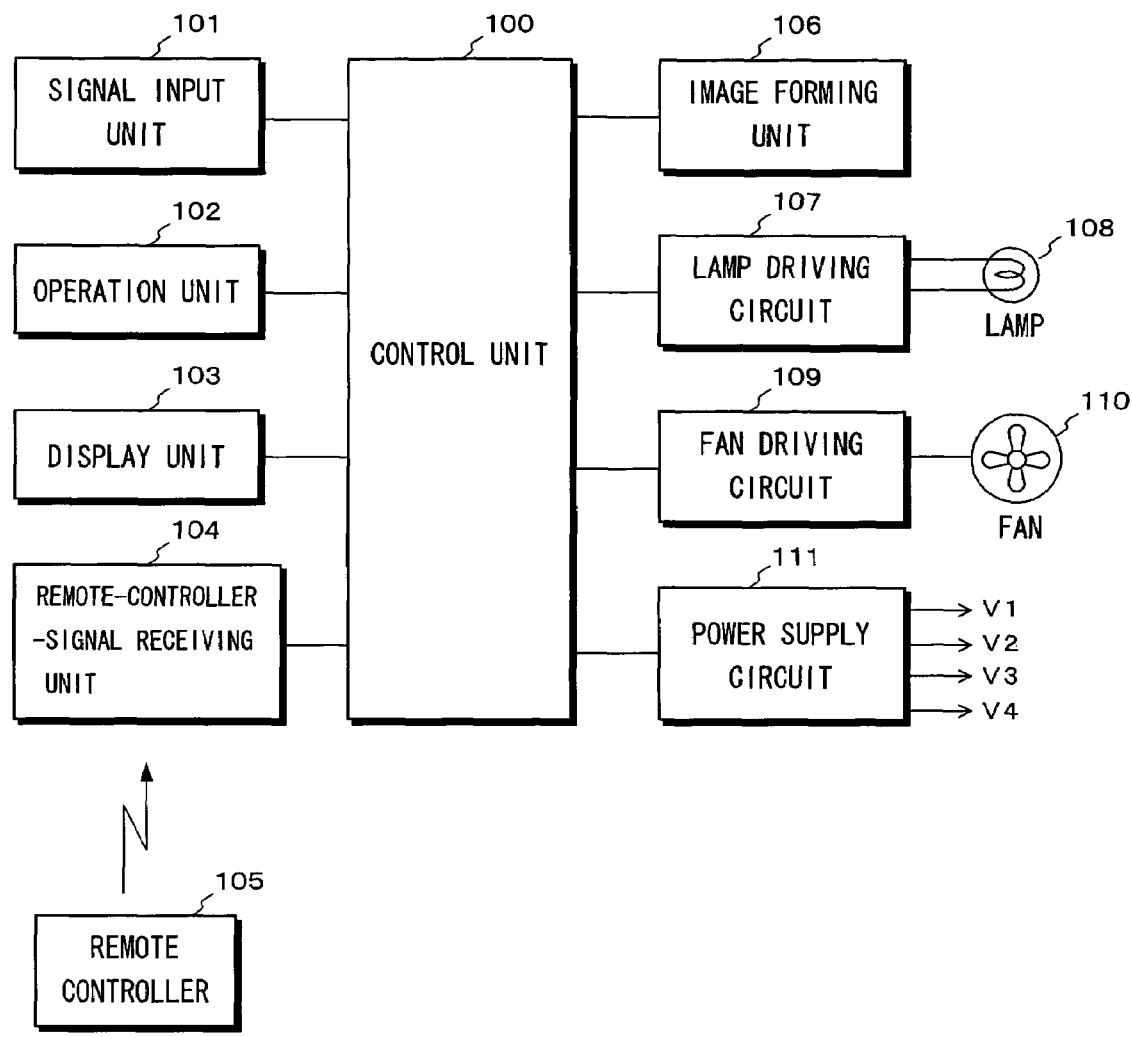
FIG. 1 is an electric block diagram showing a whole configuration of a projector.

FIG. 1 is an electric block diagram showing a whole configuration of a projector. Reference numeral 100 denotes a control unit for controlling the operation of the projector, which is constructed by a microcomputer and a memory. Reference numeral 101 denotes a signal input unit having a plurality of signal terminals according to kinds of input signals. Reference numeral 102 denotes an operation unit provided on the top face of a casing, which has various operation buttons. Reference numeral 103 denotes a display unit such as a lamp indicating an on/off state of a power supply. Reference numeral 104 denotes a remote-controller-signal receiving unit for receiving a signal from a remote controller 105. Reference numeral 106 denotes an image forming unit for forming an image to be projected onto a screen (not shown) based on a signal input from the signal input unit 101. Reference numeral 107 denotes a lamp driving circuit which has a PWM (Pulse Width Modulation) circuit for driving a lamp 108. The lamp 108 is a projection lamp for projecting an image formed by the image forming unit 106 onto a screen. Reference numeral 109 denotes a fan driving circuit having a PWM circuit and a driving motor for driving a fan 110. Reference numeral 111 denotes a power supply circuit for supplying predetermined DC voltages V1, V2, ... according to drive voltages respectively to units such as the control unit 100, image forming unit 106, lamp driving circuit 107, and fan driving circuit 109.

Figure 2:
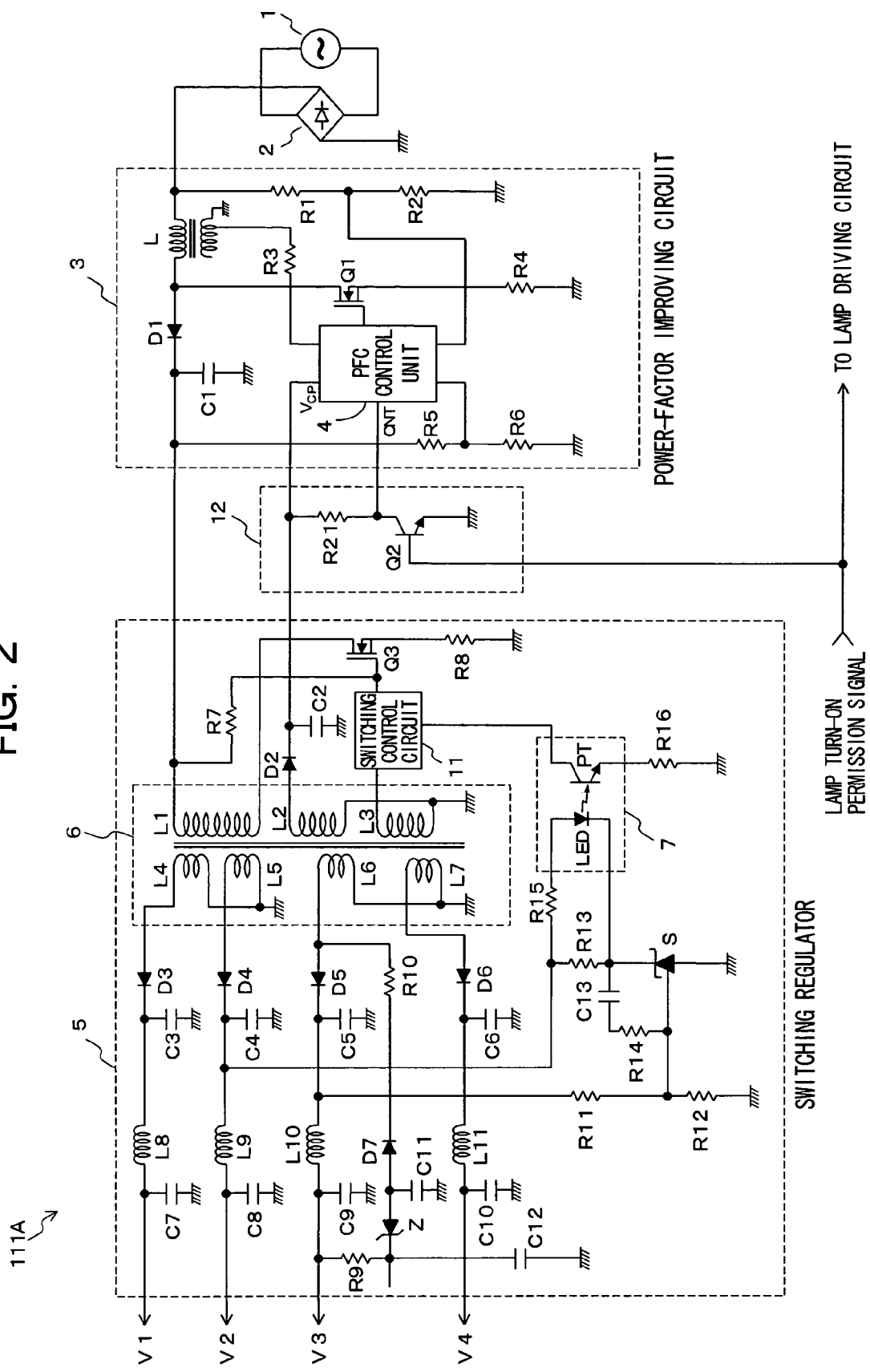
FIG. 2 is a circuit diagram of a power supply circuit according to a first embodiment of the invention.

FIG. 2 is a concrete circuit diagram of a power supply circuit 111A according to a first embodiment. Reference numeral 1 denotes a commercial alternating current power supply (hereinafter, simply called "power supply"), reference numeral 2 denotes a rectifier circuit for performing full-wave rectification on the AC voltage of the power supply 1, reference numeral 3 denotes a power-factor improving circuit to which the voltage subjected to the full-wave rectification in the rectifier circuit 2 is supplied and which improves the power factor seen from the power supply 1 side, and reference numeral denotes a switching regulator to which the power-factor improving circuit 3 is connected on the primary side of a transformer 6, and from which DC voltages V1, V2, ... for loading are output from the secondary side.

In the power-factor improving circuit 3, reference characters R1 to R6 denote resistors, L denotes a winding of a transformer, D1 denotes a diode for rectification, C1 denotes a smoothing capacitor, Q1 denotes a switching element made by an FET, and 4 denotes a PFC (Power Factor Correction) control unit constructed by an IC in which a control circuit for controlling the switching element Q1 is assembled. The configuration of the power-factor improving circuit 3 is publicly known. The PFC control unit 4 outputs a control signal for driving the switching element Q1 based on a voltage divided by the voltage-dividing resistors R1 and R2 on the input side and a voltage divided by the voltage-dividing resistors R5 and R6 on the output side. The switching element Q1 performs ON/OFF operation at predetermined timings based on the control signal. By the switching operation, the waveform of current flowing in the winding L becomes similar to the voltage waveform of a sine wave, and the power factor seen from the power supply 1 side improves. $V_{CP}$ denotes a drive voltage for operating the PFC control unit 4, and CNT indicates a control signal for making the PFC control unit 4 operative or inoperative.

In the switching regulator 5, R7 to R16 denote resistors, D2 to D7 denote diodes, C2 to C13 denote capacitors, L1 to L3 denote windings on the primary side of the transformer 6, L4 to L7 denote windings on the secondary side of the transformer 6, L8 to L11 denote windings constructing low pass filters in cooperation with the capacitors C7 to C10, Z denotes a voltage regulating diode, and S denotes a shunt regulator. 6 denotes a high-frequency transformer. The power-factor improving circuit 3 is connected to the primary side of the transformer 6, and the DC voltages V1 to V4 for a load are output from the secondary side. A switching element Q3 constructed by an FET is connected in series to the winding L1 on the primary side of the transformer 6. The winding L2 supplies a drive voltage to the PFC control unit 4. L3 denotes a winding for driving the switching element Q3. Reference numeral 11 denotes a switching control circuit for controlling ON/OFF operation of the switching element Q3. The windings L4 to L7 on the secondary side of the transformer 6 output different DC voltages V1 to V4, respectively, in accordance with a load. Reference numeral 7 denotes a photocoupler constructed by a light emitting diode LED and a phototransistor PT. A feedback circuit for feeding back an output voltage (V2) on the secondary side to the primary side is constructed by the photocoupler 7 together with the resistors R11 to R16, the capacitor C13, and the shunt regulator S.

The switching regulator 5 is a publicly known one using a flyback RCC (Ringing Choke Converter) as a self-oscillating converter. By the ON/OFF operation of the switching element Q3, current flowing in the winding L1 is interrupted. During the period in which the switching element Q3 is ON, energy is accumulated in the transformer 6. During the period in which the switching element Q3 is OFF, the accumulated energy is released to the secondary side, and the plurality of DC voltages V1 to V4 are output from the windings L4 to L7, respectively. When the output voltage on the secondary side of the transformer 6 changes due to fluctuations in the load, the output voltage is fed back to the primary side via the photocoupler 7. The switching control circuit 11 controls the switching operation (frequency or pulse width) of the switching element Q3 so that the output voltage on the secondary side becomes constant.

Next, the characteristic part of the invention in FIG. 2 will be described. According to the present embodiment, a signal detecting circuit 12 for detecting a lamp turn-on permission signal is provided. The lamp turn-on permission signal is sent from the microcomputer of the control unit 100 (FIG. 1) to the lamp driving circuit 107. Based on the signal, the lamp driving circuit 107 turns on the lamp 108. In the standby mode in which the lamp 108 is turned off, the lamp turn-on permission signal is not output from the control unit 100. Therefore, by detecting the presence or absence of the lamp turn-on permission signal by the signal detecting circuit 12, whether the projector is in the normal operation mode or in the standby mode can be determined.

The signal detecting circuit 12 is constructed by a resistor 21 and a transistor Q2 in this case. In the normal operation mode, the lamp turn-on permission signal is input to the base of the transistor Q2 and the transistor Q2 is turned on. Accordingly, the control signal CNT output from the collector of the transistor Q2 becomes the "L" (low) level. In response to the control signal, the PFC control unit 4 operates, and the above-described power-factor improvement is performed by the switching operation of the switching element Q1. On the other hand, in the standby mode, the lamp turn-on permission signal is not input to the base of the transistor Q2, so that the transistor Q2 is turned off, and the control signal CNT output from the collector of the transistor Q2 becomes the "H" (high) level. In response to the control signal, the PFC control unit 4 stops operating, the switching element Q1 is turned off, and the power-factor improving circuit 3 stops.

As described above, according to the first embodiment, whether the present state is the standby state or not is determined by using the lamp turn-on permission signal. When the present state is the standby state, the operations of the PFC control unit 4 and the switching element Q1 are stopped. Therefore, by a hardware method using the existing lamp turn-on permission signal, temperature rise in the power-factor improving circuit 3 in the standby mode can be decreased. As a result, it becomes unnecessary to drive the fan 110 (FIG. 1) to perform forced cooling, so that useless power consumption and occurrence of noise can be prevented.

In the example shown in FIG. 2, the signal detecting circuit 12 is provided separately from the PFC control unit 4. Alternately, it is also possible to assemble the functions of the signal detecting circuit in the PFC control unit 4 and supply the lamp turn-on permission signal itself as the control signal CNT directly to the PFC control unit 4.

Figure 3:
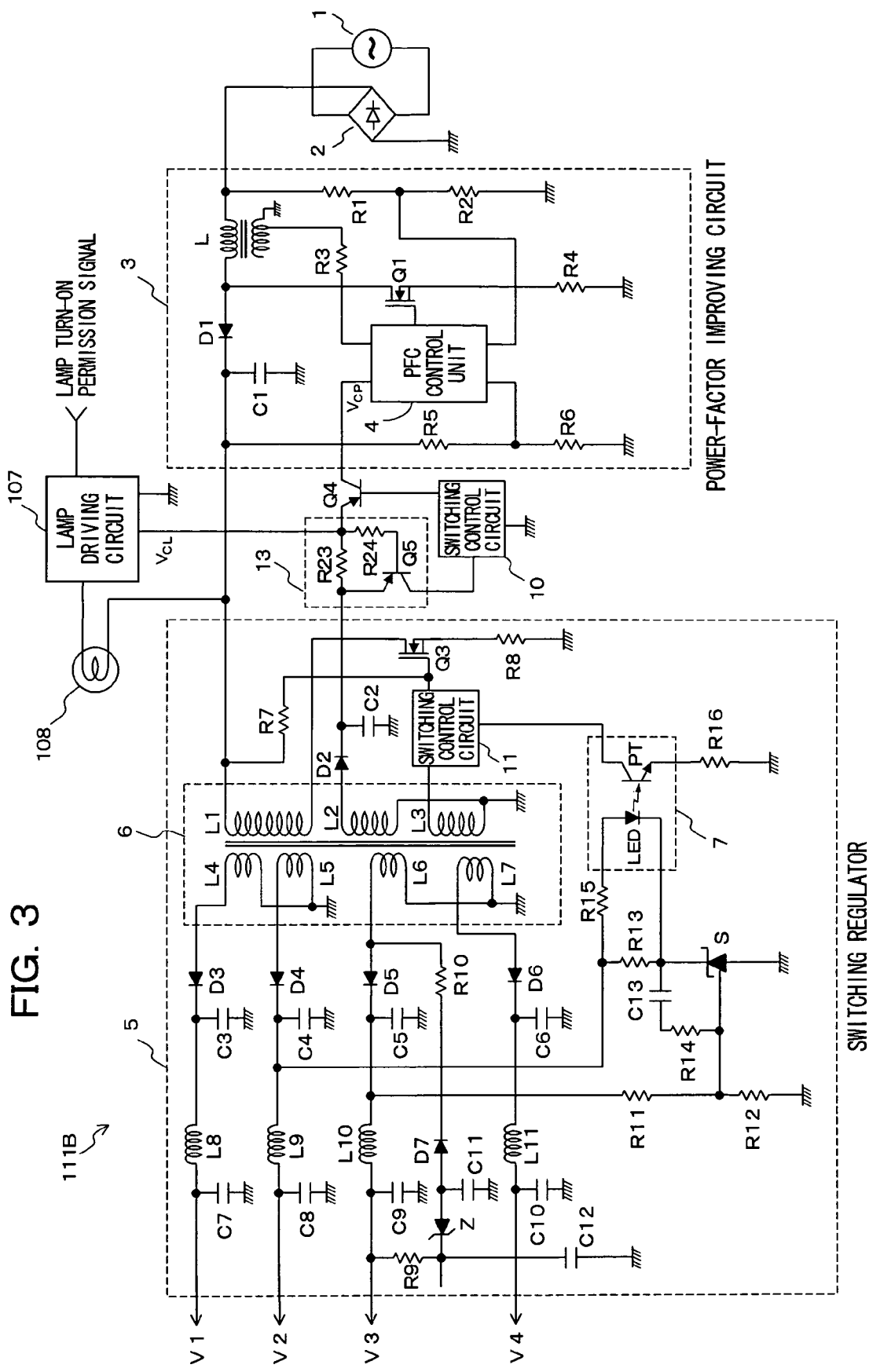
FIG. 3 is a circuit diagram of a power supply circuit according to a second embodiment of the invention.

FIG. 3 is a concrete circuit diagram of a power supply circuit 111B according to a second embodiment. Since the configurations and operations of the power source 1, rectifier circuit 2, power-factor improving circuit 3, and switching regulator 5 are the same as those shown in FIG. 2, the same reference numerals are designated to the parts same as those in FIG. 2 and their description will not be repeated. Reference numerals 107 and 108 denote the lamp driving circuit and the lamp, respectively, which are the same as those shown in FIG. 1. To the lamp driving circuit 107, the above-described lamp turn-on permission signal is supplied. In the second embodiment, the control signal CNT in FIG. 2 is not supplied to the PFC control unit 4.

The characteristic part of the invention in FIG. 3 will now be described. According to the present embodiment, a current detecting circuit 13 for detecting current in the lamp driving circuit 107, a switching control circuit 10, and a transistor Q4 as a switching element which is turned on/off by the switching control circuit 10 are provided between the power-factor improving circuit 3 and the switching regulator 5. The current detecting circuit 13 is constructed by resistors R23 and R24 and a transistor Q5. From the connection point between the resistor R23 and the transistor Q4 to the lamp driving circuit 107, a drive voltage $V_{CL}$ for driving the lamp driving circuit 107 is supplied.

Figure 4:
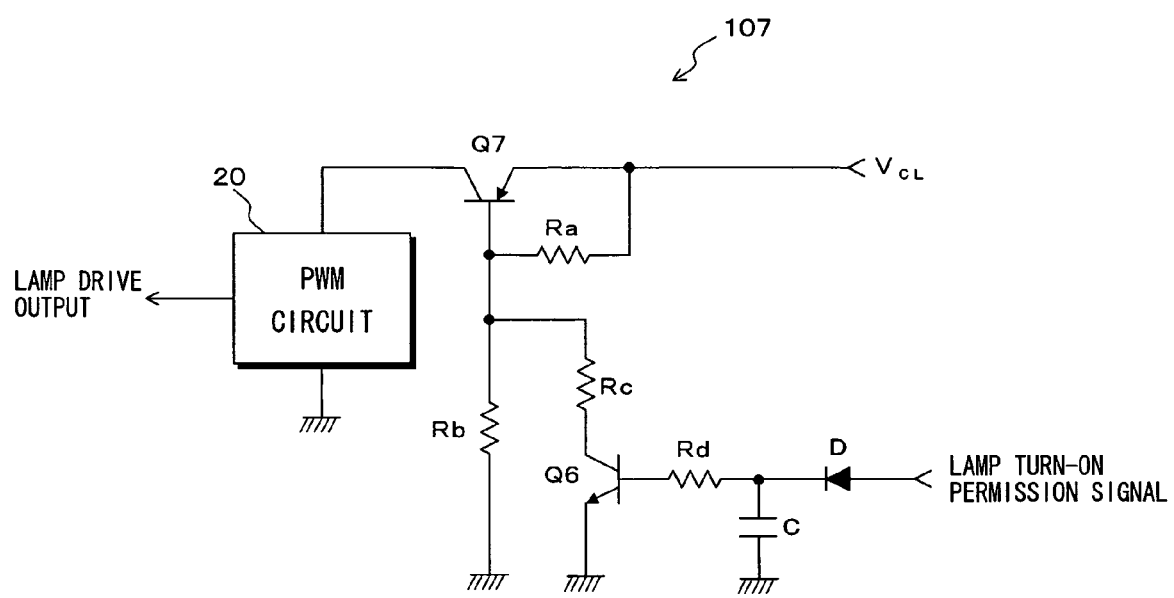
FIG. 4 is a circuit diagram showing an example of a lamp driving circuit.

FIG. 4 is a circuit diagram showing an example of the lamp driving circuit 107. Reference characters Ra to Rd denote resistors, D denotes a diode, C denotes a capacitor, Q6 and Q7 denote transistors as switching elements, and reference numeral 20 indicates a PWM circuit for driving the lamp 108. The above-described lamp turn-on permission signal is input to the base of the transistor Q6 via the diode D, the capacitor C, and the resistor Rd. The above-described drive voltage $V_{CL}$ is supplied to the PWM circuit 20 via the transistor Q7.

In the normal operation mode, when the lamp turn-on permission signal is input to the lamp driving circuit 107, the transistor Q6 is turned on. When the transistor Q6 is turned on, the transistor Q7 is also turned on, and the drive voltage $V_{CL}$ is supplied to the PWM circuit 20 via the transistor Q7. It makes the PWM circuit 20 operative and, in response to a drive output therefrom, the lamp 108 is turned on. In this state, the current in the lamp driving circuit 107 (the current flowing in the power supply line of $V_{CL}$) is, for example, 0.3A. A voltage drop in the resistor R23 in FIG. 3 increases, and the transistor Q5 is turned on. When the transistor Q5 is turned on, in response to an output signal from the switching control circuit 10, the transistor Q4 is also turned on. Thereby, the drive voltage $V_{CP}$ is supplied from the winding L2 of the transformer 6 to the PFC control unit 4 via the transistor Q4, so that the PFC control unit 4 and the switching element Q1 operate and the above-described power-factor improving operation is performed.

On the other hand, in the standby mode, the lamp turn-on permission signal is not input to the lamp driving circuit 107 in FIG. 4, so that the transistor Q6 is in turned off. Since the transistor Q6 is turned off, the transistor Q7 is also turned off, and the drive voltage $V_{CL}$ is not supplied to the PWM circuit 20. Thereby, the PWM circuit 20 becomes inoperative and the lamp 108 is turned off. In this state, the current in the lamp driving circuit 107 (the current flowing in the power supply line of $V_{CL}$) is, for example, 0.1A or less. The voltage drop in the resistor R23 in FIG. 3 decreases, and the transistor Q5 is turned off. When the transistor Q5 is turned off, in response to an output signal from the switching control circuit 10, the transistor Q4 is also turned off. Thus, the drive voltage $V_{CP}$ is not supplied from the winding L2 of the transformer 6 to the PFC control unit 4, so that the PFC control unit 4 and the switching element Q1 stop operating.

As described above, according to the second embodiment, the current in the power supply line of the lamp driving circuit 107 is detected. By detecting whether the current is equal to or lower than the predetermined value, whether the present state is the standby state or not is determined. When the present state is the standby state, by interrupting the drive voltage $V_{CP}$ of the PFC control unit 4, the operations of the PFC control unit 4 and the switching element Q1 are stopped. Therefore, by the hardware method using current of the existing lamp driving circuit, the temperature rise in the power-factor improving circuit 3 in the standby mode can be decreased. As a result, it becomes unnecessary to drive the fan 110 (FIG. 1) to perform forced cooling, useless power consumption and occurrence of noise can be prevented.

Figure 5:
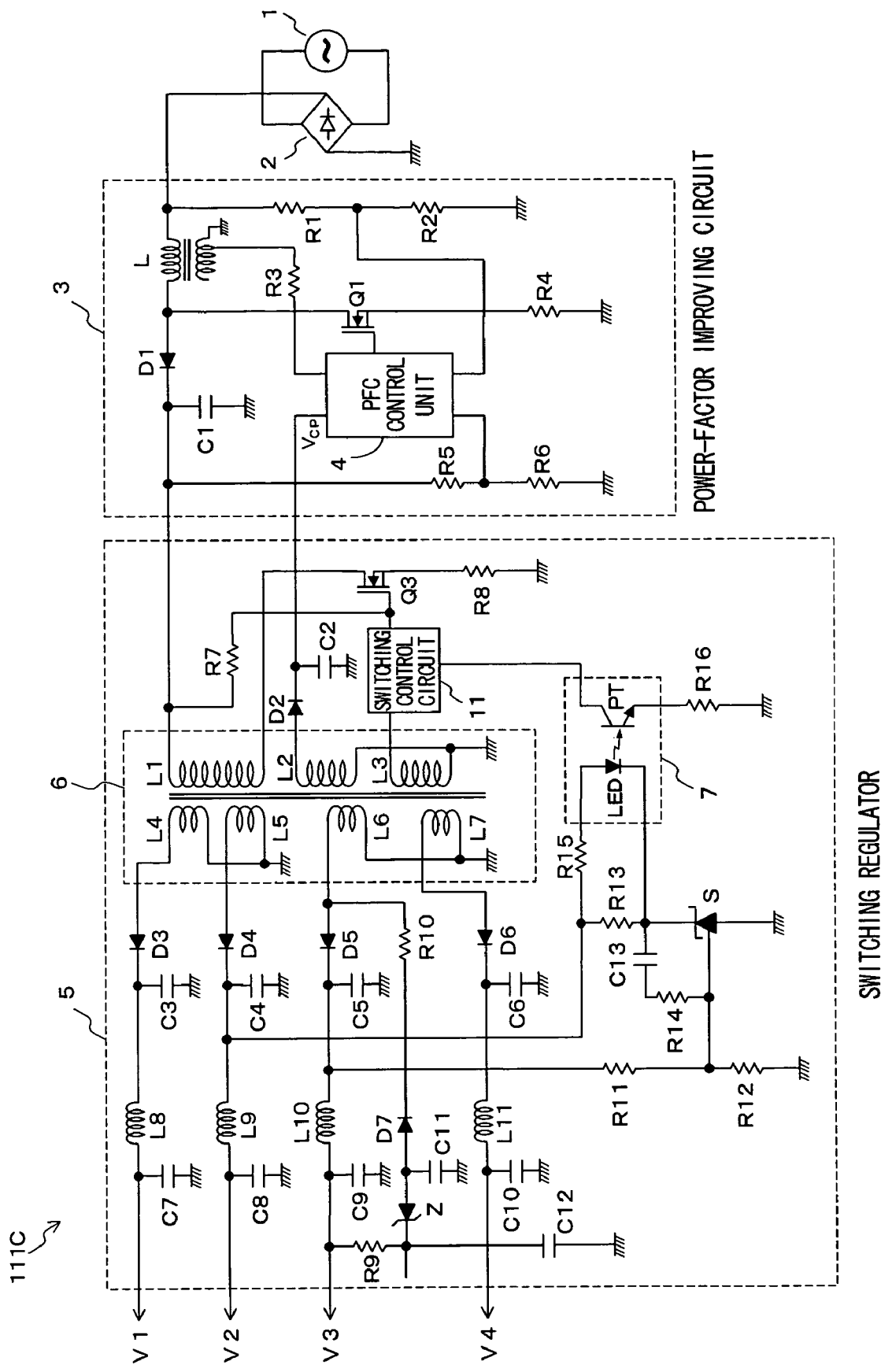
FIG. 5 is a circuit diagram of a power supply circuit according to a third embodiment of the invention.

Although some circuits are added to the existing circuits in the projector according to the foregoing first and second embodiments, a similar object can be also achieved without additional circuits. FIG. 5 is a concrete circuit diagram of a power supply circuit 111C according to a third embodiment. Since the configurations and operations of the power source 1, rectifying circuit 2, power-factor improving circuit 3, and switching regulator 5 are the same as those in FIG. 2, the same reference numerals are designated to the same parts as those in FIG. 2 and their description will not be repeated. In the third embodiment, the signal detecting circuit 12 as shown in FIG. 2 and the current detecting circuit 13 as shown in FIG. 3 are not provided between the power-factor improving circuit 3 and the switching regulator 5.

According to the third embodiment, in the case of a self-oscillating converter, the operation of the power-factor improving circuit is stopped by utilizing the fact that an output voltage of a winding on which no feedback control is performed drops in a light load state such as the standby mode. Specifically, when the projector enters the standby mode and the load on the secondary side of the transformer 6 is lightened, the output voltage of the winding L2 on which the feedback control by the photocoupler 7 is not performed drops. The winding L2 is provided to supply the drive voltage $V_{CP}$ to the PFC control unit 4, and the specification of the drive voltage $V_{CP}$ of the PFC control unit 4 is set to, for example, 12V (the lowest value). Therefore, by selecting the number of turns and an inductance value so that the output voltage of the winding L2 becomes 12V or higher in the normal operation mode and the output voltage of the winding L2 drops below 12V (for example, 11V) in the standby mode, the PFC control unit 4 can be operative in the normal operation mode and inoperative in the standby mode.

As described above, according to the third embodiment, only by adjusting the number of turns of the transformer 6 and the like, without adding a new circuit, the operation of the PFC control unit 4 is stopped in the standby mode, and the temperature rise in the power-factor improving circuit 3 can be decreased. As a result, it becomes unnecessary to drive the fan 110 (FIG. 1) to perform forced cooling, so that useless power consumption and occurrence of noise can be prevented.

What is claimed is:

1. A projector comprising:
   a lamp for projection;
   a lamp driving circuit for driving the lamp; and
   a power supply circuit for supplying a predetermined DC voltage to the lamp driving circuit,
   the power supply circuit including a rectifier circuit for performing full-wave rectification on an AC voltage of a power source, a power-factor improving circuit for improving a power factor seen from the power source side, to which the voltage subjected to the full-wave rectification in the rectifier circuit is supplied, and a switching regulator to which the power-factor improving circuit is connected on a primary side of a transformer and from which a DC voltage for a load is output on a secondary side, and
   the lamp being turned on by supplying a lamp turn-on permission signal to the lamp driving circuit,
   wherein a signal detecting circuit for detecting the lamp turn-on permission signal is provided, and
   in a standby state in which the lamp turn-on permission signal is not detected by the signal detecting circuit, operation of a PFC (Power Factor Correction) control unit provided in the power-factor improving circuit is stopped based on an output of the signal detecting circuit.

2. A projector comprising:
   a lamp for projection;
   a lamp driving circuit for driving the lamp; and
   a power supply circuit for supplying a predetermined DC voltage to the lamp driving circuit,
   the power supply circuit including a rectifier circuit for performing full-wave rectification on an AC voltage of a power source, a power-factor improving circuit for improving a power factor seen from the power source side, to which the voltage subjected to the full-wave rectification in the rectifier circuit is supplied, and a switching regulator to which the power-factor improving circuit is connected on a primary side of a transformer and from which a DC voltage for a load is output on a secondary side, and
   the lamp being turned on by supplying a lamp turn-on permission signal to the lamp driving circuit,
   wherein a current detecting circuit for detecting current in the lamp driving circuit is provided, and
   in a standby state in which current detected by the current detecting circuit is equal to or less than a predetermined value, operation of a PFC control unit provided in the power-factor improving circuit is stopped based on an output of the current detecting circuit.

3. A projector comprising:

a lamp for projection;

a lamp driving circuit for driving the lamp; and a power supply circuit for supplying a predetermined DC voltage to the lamp driving circuit, the power supply circuit including a rectifier circuit for performing full-wave rectification on an AC voltage of a power source, a power-factor improving circuit for improving a power factor seen from the power source side, to which the voltage subjected to the full-wave rectification in the rectifier circuit is supplied, and a switching regulator to which the power-factor improving circuit is connected on a primary side of a transformer and from which a DC voltage for a load is output on a secondary side, and the switching regulator being constructed by a self-oscillating converter including a switching element connected to a winding on the primary side of the transformer and performing switching operation, and a feedback circuit for feeding back a voltage on the secondary side of the transformer and controlling switching operation of the switching element, wherein, based on a fact that an output voltage of a winding for supplying a drive voltage, which is provided on the primary side of the transformer and on which feedback control is not performed, drops in a standby mode in which the lamp is turned off, by setting a drive voltage of a PFC control unit provided in the power-factor improving circuit to a predetermined value or less, operation of the PFC control unit is stopped.

\* \* \* \* \*